March 15, 1949.  R. E. CHAPPELL ET AL  2,464,487
CONDUIT FOR CORROSIVE FLUIDS
Filed July 26, 1944
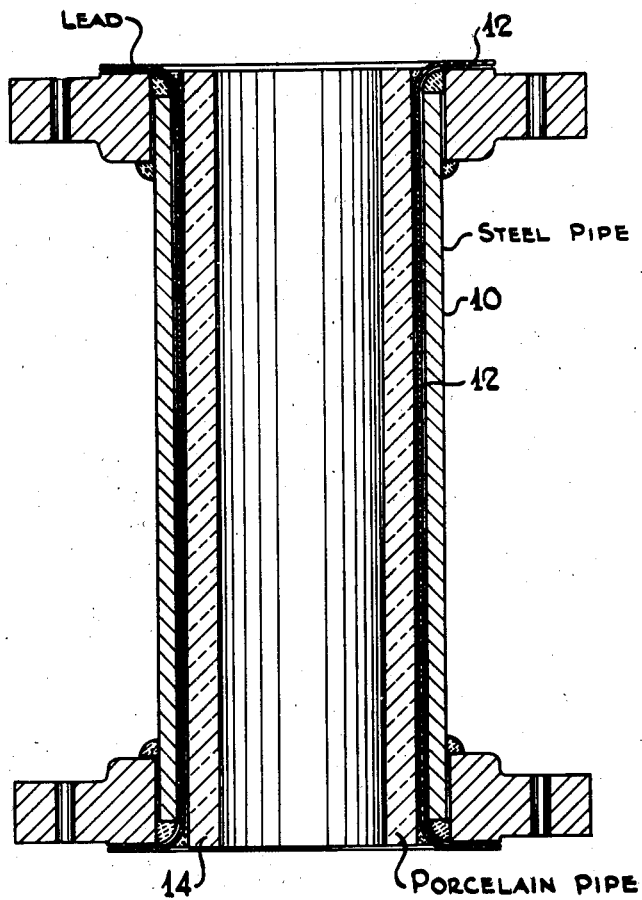
Robert E. Chappell
Clayton M. Beamer  Inventors
Ralph B. Duff
By  Attorney Patented Mar. 15, 1949

2,464,487

UNITED STATES PATENT OFFICE 2,464,487

CONDUIT FOR CORROSIVE FLUIDS

Robert E. Chappell, Clayton M. Beamer, and Ralph B. Duff, Baton Rouge, La., assignors to Standard Oil Development Company, a corporation of Delaware Application July 26, 1944, Serial No. 546,691

4 Claims. (Cl. 138—64)

This invention relates to conduits for handling corrosive fluids and more particularly to piping for processing equipment for handling corrosive liquids.

The piping for processing equipment handling corrosive fluids has been fabricated in the past from a variety of materials constructed so that an inner lining material protected to a considerable extent a casing which, in general, had to withstand the main pressure. Materials of the inner lining include glass, hard rubber and fused masses. Construction of this type has been found generally unsatisfactory for the handling of corrosive fluids under pressure and temperatures of between 250° F. and 400° F. In the case of glass and the fused materials, a particular objection is in regard to the making of fluid-tight joints in the connection of various lengths of piping. The present invention is concerned with overcoming such disadvantages and the fabrication of piping in which corrosive fluids under relatively high temperatures and pressures may be satisfactorily and safely handled.

It has been found that if a rigid, corrosion-resistant, micro-porous material such as structural carbon, porcelain or similar preparations be employed as an inner-lining material, the corrosive effects of hot acid and similar fluids are limited to the amounts of seepage through pores and cracks to the surrounding casing. The effects of infiltration of the corrosive fluids may be overcome by enclosing the micro-porous material in a non-rigid corrosion-resisting material such as lead. The setting of the micro-porous material covered with the corrosion-resistant lead into a casing has been effected by pushing the combination into a steel pipe of larger diameter so as to give a tight fit, or by fitting the combination into a split pipe and subsequently clamping. The connection between various lengths of such piping is made fluid-tight by having projecting portions of the lead coating of the micro-porous material overlap on to the flanges of the casing material and thus compacting such lead material in making tight connection between the flanges.

In some cases the covering of the inner amorphous material with the intermediate corrosion-resistant material may be avoided. This liner is used merely as an added means of protection for the casing material which, in general, undergoes deterioration due to the effect of the corrosive fluid seeping through the inner lining of the material or when the inner lining material is impervious around and under the ends. The material of this lining is of itself unsuitable as an inner lining because of its limited resistance to corrosion and erosion and because of its tendency to bulge or buckle. Similarly the outer casing may be moderately corrosion-resistant material which will permit the construction of piping involving only two materials.

As an example of the method of construction and of the piping of this invention, the illustration may be taken of selecting lengths of 6" regular piping material, such as shown in the drawing and designated by the numeral 10. Such piping permits of inter-connection by flanges. The inside of the piping is lined with sheet lead 12 of at least ¼" thickness. Inside of this liner porcelain piping 14 of about 5½" diameter is slipped and is cemented at the ends of the liner and between the liner and the lead lining with asphalt. Connection between various lengths of such piping is then made by bolting the flanges with lead to lead contact. Leakage through the inner lining into the joint may not be completely obviated by such method of construction but the formation of a film of an insoluble lead salt prevents further seepage of acid material into any gap which remains in the joint.

The piping prepared according to the invention having an inner lining of structural carbon, ceramic ware or porcelain backed by steel or similar material has been found very satisfactory. The piping has a simplicity and ease of construction, together with strength. Furthermore, the piping prepared according to this invention can be easily made a component part of equipment involving other types of materials in order to obtain a fluid-tight seal. Connection by flanges of various pieces of piping constructed according to the invention has been found to give a fluid-tight seal without any longitudinal breaking. At the present time the piping is also advantageous on account of the ready availability of the three materials employed in its fabrication.

The piping constructed according to the invention has been found to withstand severe corrosive conditions and to be particularly advantageous under high-pressure conditions when suitable selection of materials of construction has been made.

What is claimed is:

1. A conduit for handling corrosive fluids under pressure comprising a rigid corrosion-resistant micro-porous lining in a pressure-resisting casing separated therefrom by a thin film of a corrosion-resistant metallic material, said thin film of corrosion-resistant metallic material at conduit ends also being flanged outwards over said pressure-resistant casing.

2. A conduit for handling corrosive fluids under pressure according to claim 1 in which the rigid corrosion-resistant micro-porous amorphous lining is a structural carbon.

3. A conduit for handling corrosive fluids under pressure according to claim 1 in which the rigid corrosion-resistant micro-porous amorphous lining is porcelain.

4. A conduit for handling corrosive fluids under pressure according to claim 1 in which the thin film of corrosion resistance metallic material is lead.

ROBERT E. CHAPPELL.
CLAYTON M. BEAMER.
RALPH B. DUFF.

REFERENCES CITED

The following references are of record in the file of this patent:

UNITED STATES PATENTS

| Number | Name | Date |
|---|---|---|
| 33,152 | Knight | Aug. 27, 1861 |
| 38,112 | Knight | Apr. 7, 1863 |
| 595,437 | Greenfield | Dec. 14, 1897 |
| 785,176 | Mommertz | Mar. 21, 1905 |
| 895,412 | Badger | Aug. 11, 1908 |
| 930,927 | Berkstresser | Aug. 10, 1909 |
| 1,644,361 | Talbot | Oct. 4, 1927 |
| 2,006,226 | Yaxley | June 25, 1935 |

FOREIGN PATENTS

| Number | Country | Date |
|---|---|---|
| 9,475 | Switzerland | Feb. 14, 1895 |
| 11,406 | Great Britain | May 14, 1909 |
| 33,917 | Norway | Jan. 16, 1922 |
| 686,441 | Germany | Jan. 9, 1940 |
| 113,891 | Australia | Sept. 17, 1941 |